Figure 1:
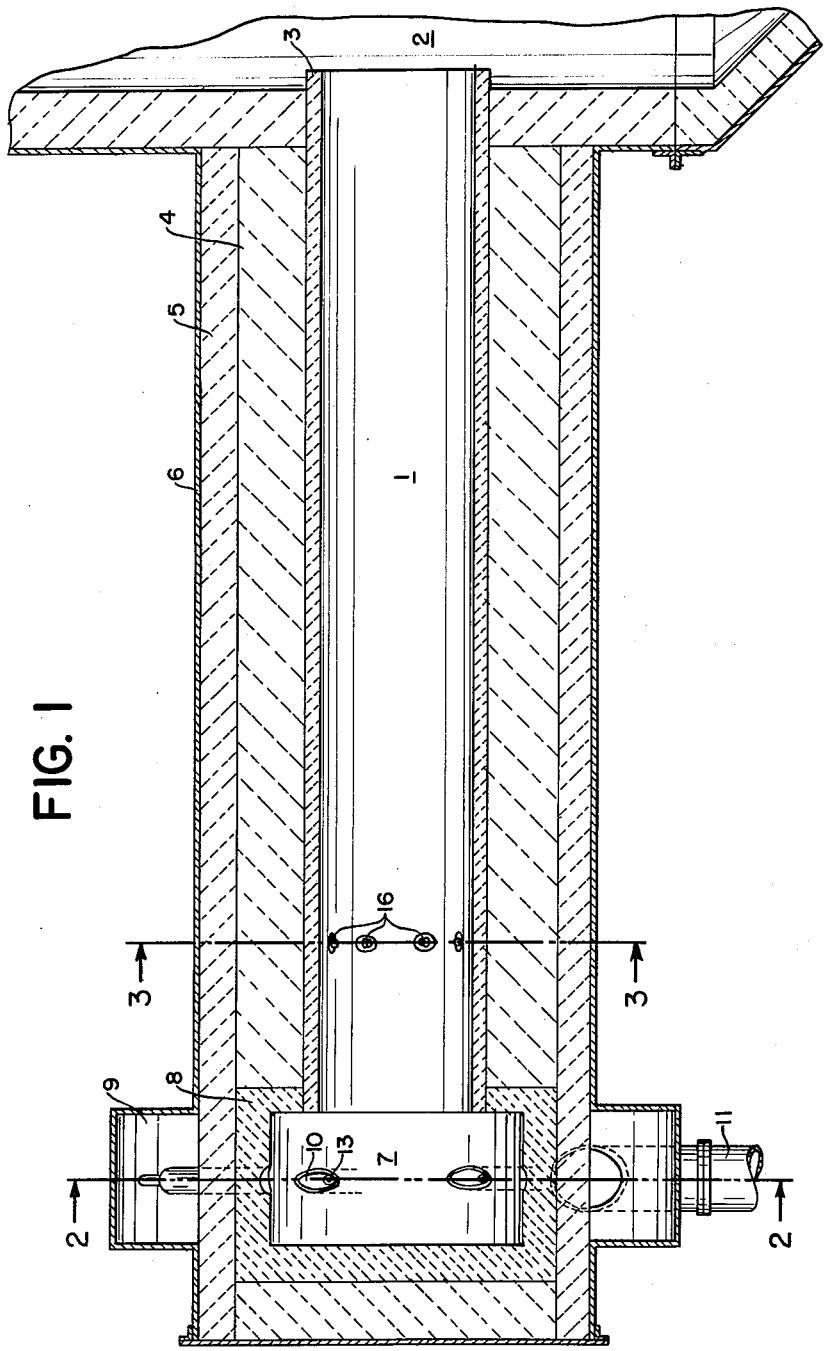

INVENTORS
JOHN S. NORRIS, JR.
GEORGE J. NOONE
BY
ATTORNEYS

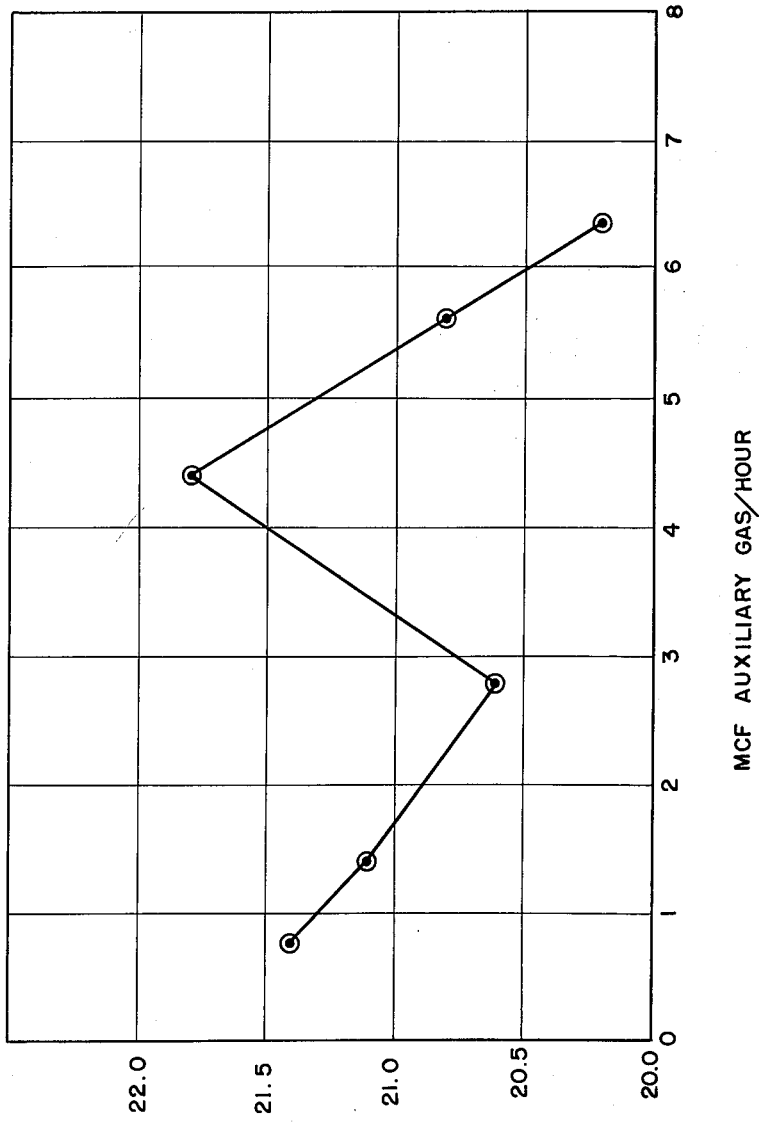

2,985,511
Patented May 23, 1961

2,985,511
CARBON BLACK MANUFACTURE

John Savage Norris, Jr., and George James Noone, Franklin, La., assignors to Columbian Carbon Company, New York, N.Y., a corporation of Delaware Filed Sept. 29, 1958, Ser. No. 764,015

5 Claims. (Cl. 23—209.4)

The present invention relates to the manufacture of furnace blacks and more particularly to processes therefor of the type involving the thermal decomposition of a hydrocarbon by rapidly, uniformly mixing it with a hot gaseous medium at a temperature in excess of that at which the hydrocarbon is decomposed to carbon black.

Operations of this type have previously been proposed wherein a mixture of a fluid fuel and an oxygen-containing gas, air for instance, is injected through one or more blast burner ports into one end of an elongated cylindrical reaction chamber, in a direction substantially tangential to the inner chamber wall, and is burned as it enters the chamber to form a swirling cyclone of hot oxidizing blast flame gases passing longitudinally through the chamber, and the hydrocarbon to be decomposed, herein designated "make," is separately injected into the swirling body of hot gases in a substantially radial direction at a point or points downstream from the burner ports.

The present invention is directed primarily to improvements in processes of the type just described whereby the oil absorption characteristics of the carbon black so produced may be independently controlled and regulated at will, and whereby it has been found possible substantially to increase the rate at which the make is charged to a given furnace without materially altering the mean particle diameter of the resultant carbon black.

The characteristic of the carbon black herein designated "oil absorption" is a measure of the absorptive capacity of the black with respect to oil, and certain other materials, and is usually expressed in terms of volume of oil absorbed by a given weight of black, for instance gallons of oil per 100 pounds of the black, under specified test conditions. The oil absorption values noted herein were determined by the method described in an article by Sweitzer and Goodrich appearing in Rubber Age (New York), vol. 55, No. 5, page 469, August 1944.

The characteristic of carbon blacks is important not only with respect to carbon blacks intended to be compounded in mixtures containing oils but also with respect to blacks intended for other purposes because it is a definite indication of the affect of the carbon black on various other compositions with which it is used, for instance, in the compounding of rubber.

It has heretofore been recognized that furnace blacks produced by the decomposition of natural gas and similar low molecular weight hydrocarbons, particularly of the paraffin series, have a characteristic relatively low oil absorption value. On the other hand, furnace blacks produced in operations of the type just described from liquid hydrocarbons, and especially those produced from residual tars and the like of high aromaticity, such as derived from the refining of petroleum to produce motor fuels, have a characteristic relatively high oil absorption.

The oil absorption value of furnace blacks is known to vary with aggregate surface area of the black. Since the surface area of a pound of carbon black of smaller particle size is greater than that of a pound of a carbon black of larger particle size, the oil absorption value will generally increase as mean particle diameter decreases. However, for a black of given particle size, oil absorption has been found to vary materially with a property of the carbon black known as "structure," i.e. the joining together of the carbon particles in reticulate chains or bundles. This structure of a carbon black is readily apparent from electron microscope examination, but the degree of structure is usually expressed as structure index, which is a correlation of oil absorption and particle size.

For certain uses, for instance for compounding with natural rubber, a relatively low structure characteristic is desirable. But where the intended use of the furnace black is for compounding with synthetic rubber, or for certain other known uses, substantially higher structure characteristics are preferred.

The oil absorption characteristic of a furnace black is of particular importance in rubber compounding since it materially affects the extrusion characteristics of the rubber composition and the modulus and tensile strength of the resultant vulcanized rubber.

It is an object of the present invention to provide a process of the type previously described in which the oil absorption characteristics of the carbon black can be independently controlled and varied without materially affecting other characteristics of the black, such as particle size. A more particular object of the invention is to control and vary the oil absorption characteristics of carbon blacks produced from such highly aromatic petroleum residues or tars and the like without materially affecting other characteristics of the black. A further object is to increase the oil charging rate to a given furnace without the usual increase in particle size.

These objects are accomplished, in accordance with the present invention, in operations of the type previously described and in which the hydrocarbon make is a relatively high molecular weight, normally liquid hydrocarbon, by separately mixing natural gas, or similar low molecular weight, normally gaseous, paraffinic hydrocarbons with the hot oxidizing blast flame gases simultaneously with the injecting and mixing of the liquid hydrocarbon make into those gases.

We have discovered that the oil absorption characteristics of a furnace black produced from such heavy aromatic residues may be controlled and regulated by simultaneously and separately introducing into the furnace chamber at the zone of make injection, and where pyrolysis of the liquid make is being initiated, a minor proportion of such normally gaseous paraffinic hydrocarbon, advantageously natural gas consisting principally of methane, and by varying the proportion of the gaseous hydrocarbon so introduced.

The present process should not be confused with the process described in Patent No. 2,768,067 in which a gaseous medium is mixed with a hot gaseous suspension of preformed carbon black particles. Nor should the present process be confused with the process described in Patent No. 2,782,101 in accordance with which oxidizing components of blast flame gases are neutralized, prior to mixing with the hydrocarbon make, by mixing a reducing gas therewith. As distinguished from the processes of those patents, the gaseous medium, herein referred to as "auxiliary gas," is separately injected into, and mixed with, the hot blast flame gases in that zone of the furnace chamber into which the hydrocarbon make is injected and is present in the hot gases during the initial formation of the carbon black particles.

We have discovered, as noted above, that a very considerable variation in structure and oil absorption characteristics of the black may be effected by varying the proportion of the auxiliary gas so introduced. Where the proportion of auxiliary gas is decreased within a relatively narrow range, we obtain an increase in structure, and where the proportion of auxiliary gas is increased within that range, we obtain a decrease in structure characteristics. But we have found, most surprisingly, that as the proportion of auxiliary gas is further increased the oil absorption increases and finally again decreases. Thus, by varying the proportion of auxiliary gas relative to the amount of oil introduced into the reaction chamber, the oil absorption characteristic of the black can be varied over a considerable range to meet particular requirements.

We are unable to explain with certainty the precise function of this auxiliary gas or the manner in which it affects the structure or oil absorption characteristics of the resultant carbon black.

While not intending to be bound as to its accuracy, we advance the following theory as a possible explanation of this peculiar phenomenon. It appears that the hydrocarbon make passes through several stages in its decomposition to carbon black. As the thermal reaction proceeds, an oil vapor is formed which becomes progressively heavier and less volatile due to cracking and condensation to higher molecular weight structures. When the dew point of these vapors is reached, minute droplets form which begin to solidify by reason of progressive dehydrogenation.

Brownian movement appears to be quite intense and collision of the droplets occurs. If this collision occurs in an environment in which the liquid droplets are predominant, there is probably coalescence of the droplets and particle distribution is affected. If such collision occurs after the particles have passed from the liquid phase, but before dehydrogenation is complete, cohesion probably occurs at the point of contact, resulting in what has been termed "structure," i.e. the formation of reticulate chains or bundles of the carbon particles.

The environment of these particles during this formative stage would thus appear to exert great influence on the final characteristics of the finished furnace black. Two principal factors appear to be the concentration of the particles, while in this critical state, and the duration of the period in which they remain in that state, i.e. after passing from the liquid phase but before completion of dehydrogenation or carbonization.

It has been recognized that a hydrocarbon gas, such as natural gas, burns more readily than the hydrocarbon oil, but that hydrocarbon oil, especially one of high aromaticity, is more quickly converted to carbon black than is natural gas.

It appears that when the auxiliary gas is so introduced and is present during this formative stage, which is, of course, a time-temperature reaction, the gas is burned by combining with excess oxygen of the blast flame gases thus locally raising the temperature of those gases and increasing the reaction rate and thus decreasing the time period over which the particles are subject to cohesion.

It appears that as the amount of auxiliary gas is first increased, the local development of heat is increased and the reaction rate is therefore increased, thus decreasing the time period during which the particles are subject to cohesion of the type resulting in structure. As the amount of auxiliary gas is decreased within that range, there is a substantial decrease in local temperature and, therefore, a decrease in reaction rate, thus increasing the opportunity of collision while the particles are in the cohesive state.

However, where the proportion of auxiliary gas is increased beyond that range, we have found, surprisingly, that the structure and oil absorption characteristics again increase. A possible explanation for this is that, since the particles pass from a cohesive state by a process of dehydrogenation, a high concentration of hydrogen in the zone of this reaction might tend to retard such dehydrogenation, thus extending the period during which the particles are subject to cohesion, thereby increasing structure and oil absorption.

A further surprising fact is that by still further increasing the proportion of auxiliary gas, the structure of the black is again decreased.

Figure 2:
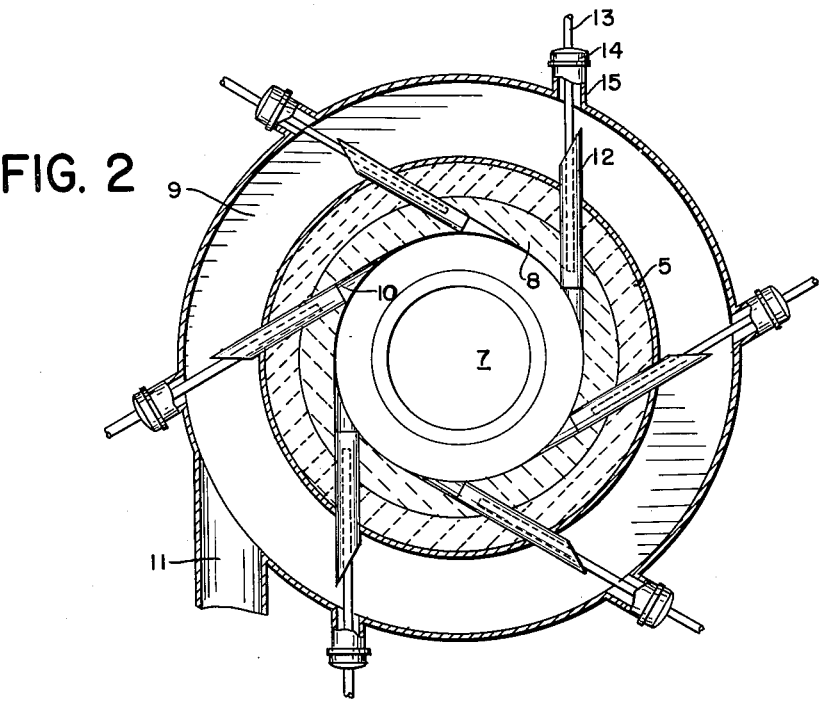
Figure 3:
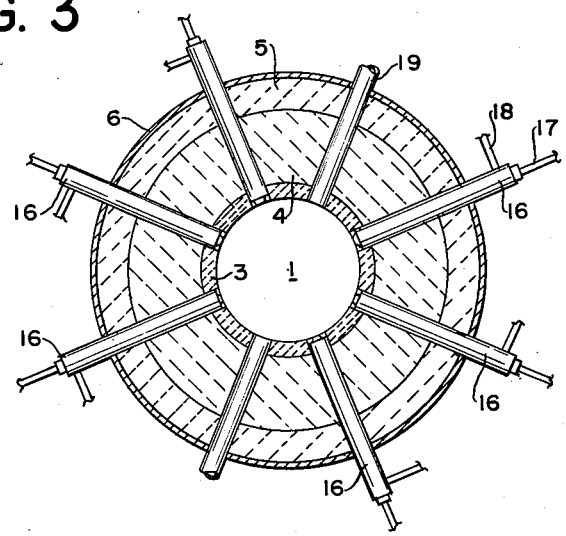

The invention will be further described and illustrated with reference to the accompanying drawings of which Fig. 1 is a longitudinal sectional view of a carbon black furnace especially adapted to the carrying out of the process, Fig. 2 is a transverse sectional view along line 2—2 of Fig. 1, Fig. 3 is a transverse sectional view along line 3—3 of Fig. 1, and Fig. 4 is a graphic illustration of the way in which oil absorption characteristics of the resultant carbon black may be varied in accordance with the present invention by varying the proportion of auxiliary gas and in which graph the amount of auxiliary gas, in units of one thousand cubic feet per hour, is plotted against oil absorption of the resultant carbon black in gallons of oil per 100 pounds of the carbon black.

An elongated cylindrical reaction chamber is represented at 1 of Fig. 1 leading at its downstream end into a conventional vertical cooler represented at 2. The reaction chamber is provided with a lining 3 of furnace refractory surrounded by a layer 4 of fire brick which is, in turn, surrounded by a layer 5 of thermal insulating material, all encased in a metal jacket 6.

At its upstream end, the chamber 1 is provided with an enlarged combustion zone 7 of a diameter greater than its longitudinal dimension and substantially greater than the diameter of the elongated portion of the chamber. The combustion zone 7 is surrounded by walls of furnace refractory indicated at 8 and is thermally insulated as previously described. The enlarged combustion zone is not an essential feature of the apparatus. Where desired, the chamber may be of uniform cross-section throughout its length.

An annular air chamber 9 is positioned about the outer walls of the combustion zone and, as more clearly shown in Fig. 2, is connected with the combustion zone by a plurality of blast burner ports which enter the combustion zone in a direction substantially tangential to the inner side wall thereof. Air for combustion is delivered to chamber 9 under pressure through air conduit 11 entering chamber 9 in a substantially tangential direction so as to provide more uniform air distribution.

Each of the burner ports 10 is provided with a sleeve 12, cut diagonally at its outer end to assist in directing the combustion air into the burner ports, and coaxially positioned within each sleeve 12 is fuel injection tube 13 held in position by cap 14 secured to the tubular members 15 extending from the outer metal casing of the air chamber 9.

As more clearly shown in Fig. 3, symmetrically positioned spray injectors 16, for injecting the hydrocarbon make sprays into the chamber, extend radially through the delineating side wall of the chamber. Various types of spray injectors may be used for this purpose, but, because of the relatively high temperature of the furnace wall, it is advisable to use spray injectors provided with means for preventing excessive heating of the hydrocarbon make as it passes through the chamber wall. Spray assemblies of this type are available and need not here be described in detail.

The spray assembly may, for instance, be of the type in which the liquid hydrocarbon make is dispersed in steam, or other atomizing gas, prior to being passed through the chamber wall, or may be of the type in which the liquid hydrocarbon make is charged to the spray assembly through tube 17 and the atomizing gas, for instance steam, separately charged to the assembly through line 18.

Also, as more clearly shown in Fig. 3, auxiliary gas injection tubes 19 are provided for separately and simultaneously introducing the auxiliary gas into the reaction zone.

In the apparatus shown, six make spray injectors and two auxiliary gas injectors are provided. It will be understood, however, that the invention is not so restricted, that either a greater or lesser number of symmetrically positioned make spray injectors may be used. We have found it desirable to use at least two symmetrically positioned auxiliary gas tubes directed radially into the furnace chamber, but the invention in its broader aspect is not so restricted.

In operation, a fluid hydrocarbon fuel, advantageously natural gas, is injected tangentially into the combustion zone in admixture with an oxygen-containing gas, advantageously air, and the resultant mixture is burned as it enters the chamber to form a swirling stream of hot blast flame gases which passes longitudinally through the reaction chamber along a helical path at high velocity. The proportions of air and fuel should be so selected as to produce a somewhat oxidizing blast flame.

The hydrocarbon make in the form of gas-atomized liquid sprays is injected substantially radially into this swirling hot gas stream and is mixed therewith, and decomposed by heat absorbed form the hot gases to form carbon black in suspension, the gaseous suspension passing from the downstream end of the chamber into cooler 2 and the carbon black is separated and collected in conventional manner.

The operation just described constitutes no part of our present invention, except in combination with the novel feature of separately injecting the auxiliary gas into that zone of the chamber into which the hydrocarbon make is simultaneously and separately introduced. This auxiliary gas may, with advantage, be introduced through unconstricted tubes such as shown at 19 of Fig. 3, but tubes which are constricted at their exit, by a nozzle, for instance, may likewise be used.

The variation of oil absorption characteristic with the amount of auxiliary gas introduced is illustrated by a series of six runs carried out in a furnace substantially as shown in the drawings. In each of these runs, the air was charged to the furnace at a rate of 200,000 cubic feet per hour. The fuel was natural gas and the air-to-fuel gas ratio was 12:1. The make was a petroleum residuum of high aromaticity, hereinafter described, and was charged to the furnace at a total rate of 110 gallons per hour atomized by saturated steam at a pressure of 40 pounds per square inch. In these runs, the amounts of auxiliary gas was varied over a considerable range extending from 760 cubic feet per hour to 6380 cubic feet per hour, other conditions remaining constant. The oil absorption characteristics of the resultant furnace blacks are shown on the accompanying graph, Fig. 4 of the drawings.

The fineness of the resultant furnace blacks, as indicated by color, and their tensile strength characteristics in rubber were substantially identical, despite the very substantial differences in oil absorption characteristics.

It will be understood that the proportions of auxiliary gas used are not restricted to the illustrative range but may be varied over a substantially greater range extending from 4 cubic feet per gallon of oil to 200 cubic feet per gallon of oil, depending upon other operating conditions and the results desired. Especially advantageous results may be obtained using proportions of auxiliary gas within the range of about 7 to 100 cubic feet per gallon of a highly aromatic petroleum tar make. Lower proportions have no practical effect and, where greater proportions of the auxiliary gas are used, other characteristics of the resultantt black are adversely affected.

It is recognized that it has previously been proposed to use natural gas as a gaseous atomizing medium for spraying the hydrocarbon make into the reaction chamber. In such operations, the natural gas and the hydrocarbon make would, of course, be introduced into the reaction zone simultaneously but not separately. We have found that in order to obtain the desired control of oil absorption characteristics of the resultant black, it is essential that the auxiliary gas be separately injected into the zone of reaction.

A series of runs has been carried out to illustrate the differences in the resulting product obtained by using the natural gas as an atomizing medium for the hydrocarbon make and separately introducing the auxiliary gas into the furnace chamber in accordance with our present invention. This series of runs also illustrates a further highly desirable feature of our present invention, namely, the permissible substantial increase in oil load without materially altering the mean particle diameter of the resultant carbon black, as indicated by color and tinting strength.

In each of these runs, air was charged to the furnace at the rate of 180,000 cubic feet per hour and fuel gas was charged at the rate of 13,800 cubic feet per hour, the ratio in each instance being 13. In the first two runs of the series, the oil loads were identical. In run 1, natural gas at the rate of 8,200 cubic feet per hour was introduced into the furnace in admixture with the hydrocarbon make as an atomizing gas. In the remaining runs, the same quantity of natural gas was separately injected into the reaction zone in accordance with the present invention.

In the following tabulation, we have set forth the oil loads of the respective runs and the colloidal, chemical and rubber compounding characteristics of the resulting products:

Table I

| Run No. | 1 | 2 | 3 | 4 | 5 |
|---|---|---|---|---|---|
| Oil Load, Gallons/Hour | 78 | 78 | 90 | 102 | 114 |
| Color Value, ABC | 136 | 139 | 140 | 141 | 138 |
| Tinting Strength, Percent Standard FF Black | 124 | 126 | 124 | 124 | 119 |
| Oil Absorption, Gallons per 100 lbs | 14.9 | 16.3 | 15.8 | 16.0 | 16.0 |
| L-300: | | | | | |
| 20' cure | 835 | 935 | 985 | 1,105 | 1,050 |
| 80' cure | 1,480 | 1,600 | 1,635 | 1,700 | 1,665 |
| L-500, 80' cure | 3,000 | 3,220 | 3,210 | 3,335 | 3,200 |
| Tensile, 80' cure | 3,575 | 3,750 | 3,675 | 3,700 | 3,625 |
| Log R | 3.1 | 2.6 | 2.6 | 2.8 | 3.3 |
| Rebound | 49.1 | 47.3 | 46.9 | 47.3 | 48.7 |

The results of the following comparative runs are here given to illustrate the differences in results obtained by introducing the auxiliary gas in accordance with the present invention and introducing it upstream from the reaction zone.

In each of these runs, combustion air was charged at the rate of 200,000 cubic feet per hour and the fuel gas was charged at the rate of 16,650 cubic feet per hour, the ratio in each run being 12:1. In each run, the hydrocarbon make was the same and was charged at the rate of 110 gallons per hour.

In the first of these runs, natural gas was introduced into the hot blast flame gases upstream from the zone in which the hydrocarbon make is introduced at the rate of 5,550 cubic feet per hour. In the second run, the same quantity of natural gas was separately introduced into that zone of the chamber into which the hydrocarbon make was injected. The properties of the carbon black resulting from the respective runs are set forth in the following tabulation:

Table II

| Run No. | 1 | 2 |
|---|---|---|
| ABC Color | 136 | 139 |
| Tinting Strength, Percent Standard FF | 122 | 124 |
| Oil Absorption, Gallons per 100 lbs | 18.8 | 21.0 |
| pH | 7.58 | 7.48 |
| Percent Benzene Extract | .11 | .14 |
| DPG Adsorption | 8.25 | 9.80 |
| Percent Volatile | 4.32 | 1.56 |
| Percent Ash | .44 | .64 |

When compounded with rubber according to identical formulae and the composition cured for the indicated periods, the characteristics of the resultant rubber composition were found to be as follows:

Table III

| Run No. | 1 | 2 |
|---|---|---|
| L-300: | | |
| 20' Cure | 785 | 980 |
| 30' Cure | 1,100 | 1,330 |
| 40' Cure | 1,220 | 1,520 |
| 60' Cure | 1,440 | 1,650 |
| 80' Cure | 1,450 | 1,725 |
| Tensile: | | |
| 20' Cure | 2,775 | 2,725 |
| 30' Cure | 3,325 | 3,250 |
| 40' Cure | 3,400 | 3,500 |
| 60' Cure | 3,575 | 3,525 |
| 80' Cure | 3,550 | 3,400 |
| Elongation: | | |
| 20' Cure | 745 | 710 |
| 80' Cure | 590 | 525 |
| Hardness: | | |
| 20' Cure | 53 | 55 |
| 80' Cure | 57 | 59 |
| Log R | 3.1 | 2.6 |
| Percent Rebound | 50.6 | 48.7 |

In each of the runs described herein, the hydrocarbon make was a highly aromatic, heavy petroleum residuum or tar of which the following is a typical analysis:

| | |
|---|---|
| Viscosity, SSU, at 100° F | 2000 |
| Viscosity, SSU, at 130° F | 530 |
| Viscosity, SSU, at 210° F | 71 |
| Viscosity ratio | 7.48 |
| Index of refraction | 1.665 |
| A.P.I. gravity | 1.4 |
| Molecular weight | 280 |
| Ramsbottom carbon residue, percent | 12.30 |

In determining the rubber properties set forth in the foregoing tabulations, the following formulation was used:

| | Parts by weight |
|---|---|
| Low temperature polymer | 100 |
| Carbon black | 50 |
| Zinc oxide | 3 |
| Stearic acid | 3 |
| Asphaltic flux plasticizer | 9 |
| Antioxidant | 1 |
| Sulfur | 1.6 |
| Benzothiazyl disulphide | 0.6 |
| 1,3-diphenylguanidine | 0.75 | cured at a temperature of 292° for the indicated time period. For determining rebound, the curing time was 80 minutes.

We claim:
1. In the process for producing carbon black by the decomposition of a hydrocarbon make in which a turbulent swirling body of hot oxidizing blast flame gases is caused to pass longitudinally through an elongated, cylindrical reaction chamber at a temperature in excess of that at which the hydrocarbon is decomposed to form carbon black, and a liquid hydrocarbon make to be decomposed to carbon black is injected as a liquid spray into the swirling gases at an intermediate point along the path of the hot gases through the chamber, the hydrocarbon is decomposed by heat absorbed from hot gases to form carbon black and the carbon black is separated from the furnace effluent gases, the method of independently altering the oil absorption characteristics of the black without substantial change in particle size comprising separately injecting a normally gaseous paraffinic hydrocarbon into the hot gas stream in that zone of the furnace chamber into which the liquid hydrocarbon is simultaneously introduced and in which the pyrolysis of the said liquid hydrocarbon is initiated, the amount of gas separately introduced into the hot gas stream relative to the amount of liquid hydrocarbon introduced thereinto determining the oil absorption characteristics of the resultant black.

2. The process of claim 1 in which the liquid hydrocarbon to be decomposed to carbon black is a highly aromatic residual hydrocarbon and is injected into the reaction chamber as a gas-atomized spray.

3. The process of claim 1 in which the gaseous paraffinic hydrocarbon consists predominantly of methane.

4. The process of claim 1 in which the gaseous paraffinic hydrocarbon is introduced in a proportion within the range of 4 cubic feet to 200 cubic feet per gallon of the hydrocarbon make.

5. The process of claim 1 in which the gaseous paraffinic hydrocarbon is introduced in a proportion within the range of about 7 cubic feet to about 100 cubic feet per gallon of the hydrocarbon make.

References Cited in the file of this patent

UNITED STATES PATENTS

| | | |
|---|---|---|
| 2,659,662 | Heller | Nov. 17, 1953 |
| 2,705,189 | Ekholm | Mar. 29, 1955 |
| 2,768,067 | Heller | Oct. 23, 1956 |
| 2,782,101 | Heller | Feb. 19, 1957 |
| 2,801,157 | Campbell et al. | July 30, 1957 |